(12) United States Patent
Kourous-Harrigan et al.

(10) Patent No.: US 12,445,816 B2
(45) Date of Patent: Oct. 14, 2025

(54) VEHICLE ASSISTANCE IN SMART INFRASTRUCTURE NODE ASSIST ZONE

(71) Applicant: Ford Global Technologies, LLC, Dearborn, MI (US)

(72) Inventors: Helen E. Kourous-Harrigan, Monroe, MI (US); Qi Chen, Canton, MI (US); Siddharth Agarwal, Ann Arbor, MI (US); Ankit Girish Vora, Ann Arbor, MI (US); Umair Ibrahim, San Jose, CA (US); Patrick Carmody, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 451 days.

(21) Appl. No.: 17/746,296

(22) Filed: May 17, 2022

(65) Prior Publication Data

US 2023/0379674 A1    Nov. 23, 2023

(51) Int. Cl.
*H04W 4/44*    (2018.01)
*B60W 30/00*    (2006.01)
*B60W 60/00*    (2020.01)
*H04W 4/021*    (2018.01)

(52) U.S. Cl.
CPC ............ *H04W 4/44* (2018.02); *H04W 4/022* (2013.01); *B60W 30/00* (2013.01); *B60W 60/001* (2020.02); *B60W 2556/45* (2020.02)

(58) Field of Classification Search
CPC ............ B60W 2556/45; B60W 30/00; B60W 60/001; H04W 4/022; H04W 4/40; H04W 4/44; H04W 4/70; H04W 88/04; G05D 1/0088; G05D 1/227; G07C 5/008; G08G 1/0112; G08G 1/0141; G08G 1/096791
See application file for complete search history.

(56) References Cited

U.S. PATENT DOCUMENTS

| | | | |
|---|---|---|---|
| 9,942,870 B2 | 4/2018 | Khemani et al. | |
| 10,191,495 B2 | 1/2019 | Bobda | |
| 10,992,752 B2 | 4/2021 | Graefe et al. | |
| 11,029,409 B2 | 6/2021 | Cionca et al. | |
| 2011/0223880 A1* | 9/2011 | Lepejian | H04W 4/029 455/404.2 |
| 2017/0018187 A1* | 1/2017 | Kim | G08G 1/005 |
| 2017/0045367 A1* | 2/2017 | Park | G01C 21/3697 |
| 2021/0127318 A1* | 4/2021 | Zhang | H04W 40/248 |
| 2021/0209946 A1* | 7/2021 | Eilertsen | G08G 1/0969 |
| 2022/0020271 A1 | 1/2022 | Foley et al. | |

* cited by examiner

*Primary Examiner* — James J Lee
(74) *Attorney, Agent, or Firm* — Frank A. MacKenzie; Brooks Kushman P.C.

(57) ABSTRACT

A system and method for operating a vehicle operating on a route that will pass within a predetermined distance of a smart infrastructure node (IX Node) includes: retrieving, prior to receiving a message from the IX Node, data about the IX Node including (a) an IX Node assist zone based on an effective broadcast range of the IX Node, (b) an IX Node field of view area that is within the IX Node assist zone and that is defined by a field of view of one or more IX Node sensors, and (c) available services from the IX Node; and selecting a vehicle application for operation on the route while in the IX Node assist zone based on the IX Node field of view area, and the available services from the IX Node, and/or a type and accuracy of one or more IX Node sensors.

8 Claims, 7 Drawing Sheets

VEHICLE ASSISTANCE IN SMART INFRASTRUCTURE NODE ASSIST ZONE

BACKGROUND

Vehicles having autonomous or a driver assist features can operate in complex operational situations, and may have their operation supported by smart infrastructure nodes, referred to herein as IX Nodes. Such IX Nodes can have high-definition stationary sensors mounted on poles or other structures at intersections or other environments where line-of-sight sensors on vehicles have challenges and use an associated road side unit (RSU) radio to communicate with vehicles and/or other nodes. The radio coverage areas where IX Nodes assist in vehicle operation may cover the entire driving/sensing region of a vehicle or be localized so as to cover an intersection or complex urban scene.

In these cases, the vehicle relies on IX Node sensing to navigate specific intersections or scenarios. However, if a vehicle has no information about where assistive messages from the IX Node occur, it cannot make use of them. For example, the vehicle may route around difficult intersections, or not be able to detect the absence of expected service and then change modes or paths.

DETAILED DESCRIPTION

The present disclosure includes systems and methods for providing vehicles with a priori or non-location dependent data about IX Node assist zones that is useful and that may not otherwise be available for a vehicle executing autonomous and/or driver assist operations. Such data about IX Node assist zones permits vehicles to effectively utilize the information available from IX Nodes.

In an implementation, a vehicle traveling along a route including an IX Node may retrieve, prior to receiving a message from the IX Node, data about the IX Node including (a) an IX Node assist zone based on an effective broadcast range of a road side unit (RSU) radio associated the IX Node, (b) an IX Node field of view area that is within the IX Node assist zone and that is defined by a field of view of one or more IX Node sensors, and (c) one or more available services from the IX Node. With this data about the IX Node, the vehicle may select a vehicle application for operation on the route while in the IX Node assist zone based on the IX Node field of view area, and the available services from the IX Node, and/or a type and accuracy of one or more IX Node sensors.

In one or more implementations of the present disclosure, a computing device for a vehicle includes a processor and a memory, the memory storing instructions executable by the processor, the instructions including instructions to: retrieve, prior to receiving messages from a smart infrastructure node (IX Node), data about the IX Node including (a) an IX Node assist zone defined based on an effective broadcast range of a radio of the IX Node, (b) an IX Node field of view area that is within the IX Node assist zone and that is defined by a field of view of one or more IX Node sensors, and (c) available services from the IX Node; and select a vehicle application for operation on a route while in the IX Node assist zone based on the IX Node field of view area, and the available services from the IX Node, and/or a type and accuracy of one or more IX Node sensors.

In an implementation, the application may be a left turn assist application, a maneuver assist application, a pedestrian detection application, an emergency vehicle detection and response application, an intersection violation detection application, a construction zone application, a signal preemption application, or an intersection movement assistance application.

In an implementation, the IX Node assist zone may be an area having a reliability of communication from the IX Node above a predetermined threshold.

In an implementation, the IX Node assist zone and the IX Node field of view area may be defined as respective polygons.

In an implementation, the polygons may be objects included in map data stored in the vehicle.

In an implementation, the instructions to retrieve data about the IX Node may be initiated based on instructions that determine that the route on which the vehicle is operating will pass within a predetermined distance of the IX Node.

In an implementation, the instructions may further include instructions to: establish a communication link with the IX Node; collect location data upon establishing the communication link with the IX Node; and transmit the location data to a server to update a boundary of the IX Node assist zone.

In an implementation, the instructions may further include instructions to: establish a communication link with the IX Node; and transmit the Received Signal Strength Information (RSSI) of the communication link to a server to update a boundary of the IX Node assist zone.

One or more implementations of the present disclosure may also include a computing device for a server including a processor, a memory, and a database, the memory storing instructions executable by the processor, the instructions comprising instructions to: receive a request from a vehicle for data about one or more smart infrastructure nodes (IX Nodes); and transmit the data about the one or more IX Nodes to the vehicle, the data including, for each of the one or more IX Nodes, (a) an IX Node assist zone based on an effective broadcast range of a radio of the IX Node, (b) an IX Node field of view area that is within the IX Node assist zone and that is defined by a field of view of one or more IX Node sensors, and (c) one or more available services from the IX Node.

In an implementation, the IX Node assist zone may initially be determined based on analytical data from a binary predictor classifier intersecting the route with an estimated coverage reliability zone of a broadcast area of the IX Node.

An implementation may further include instructions to: collect empirical data from one or more vehicles including the vehicle of an actual broadcast range of the IX Node; and modify a boundary of the IX Node assist zone based on the collected empirical data.

An implementation may further include instructions to: collect empirical data including measured Received Signal Strength Indicator (RSSI) data from the IX Node or the vehicle; and modify a boundary of the IX Node assist zone based on the collected empirical data.

In an implementation, the IX Node assist zone may be an area having a reliability of communication from the IX Node above a predetermined threshold.

In an implementation, the IX Node assist zone and the IX Node field of view area may be defined as respective polygons.

In an implementation, the polygons may be objects included in map data.

In an implementation, the objects may be vector objects.

In one or more implementations of the present disclosure, a method of operating a vehicle on a route that will pass within a predetermined distance of a smart infrastructure node (IX Node), includes: retrieving, prior to receiving a message from the IX Node, data about the IX Node including (a) an IX Node assist zone based on an effective broadcast range of a radio of the IX Node, (b) an IX Node field of view area that is within the IX Node assist zone and that is defined by a field of view of one or more IX Node sensors, and (c) one or more available services from the IX Node; and selecting a vehicle application for operation on the route while in the IX Node assist zone based on the IX Node field of view area, and the available services from the IX Node, and/or a type and accuracy of one or more IX Node sensors.

In an implementation, the application may be a left turn assist application, a maneuver assist application, a pedestrian detection application, an emergency vehicle detection and response application, an intersection violation detection application, a construction zone application, a signal preemption application, or an intersection movement assistance application.

In an implementation, the IX Node assist zone may be an area having a reliability of communication from the IX Node above a predetermined threshold.

In an implementation, the IX Node assist zone and the IX Node field of view area may be defined as respective polygons.

Figure 1:
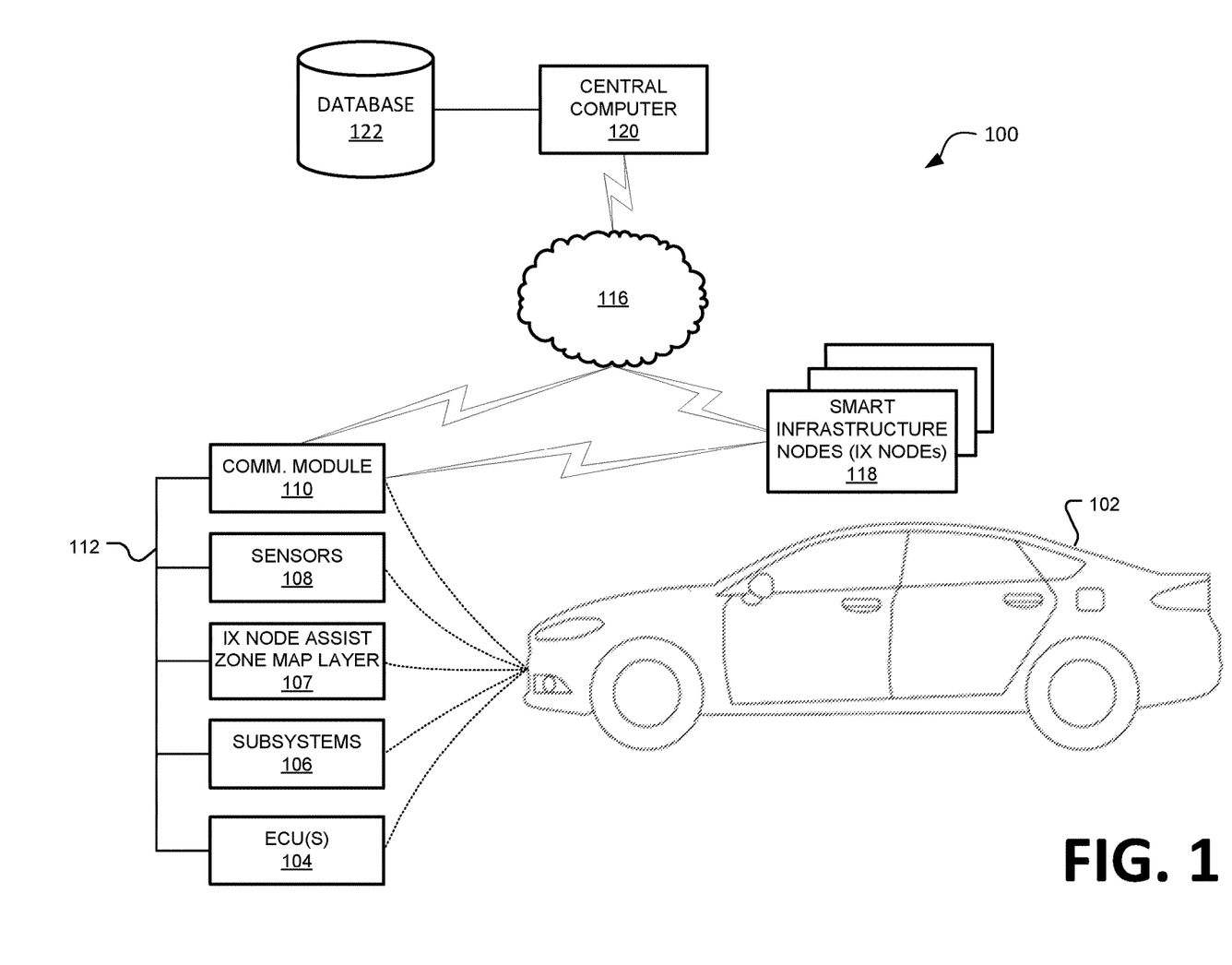
FIG. 1 is a diagram of an example system for using a map data from a map layer with infrastructure assist zones.

With reference to FIG. 1, a connected vehicle system 100 can provide communications between a vehicle 102, one or more other connected vehicles and IX Nodes 118, and a central computer 120 to share data among the various entities.

Vehicle 102 is a set of components or parts. These include hardware components and typically also software and/or programming, to perform a function or set of operations in the vehicle 102. Vehicle subsystems 106 typically include an autonomous driving system that may control a braking system, a propulsion system, and a steering system, as well as other subsystems including but not limited to a body control system, a climate control system, a lighting system, and a human-machine interface (HMI) system, which may include an instrument panel and/or infotainment system. The propulsion subsystem converts energy to rotation of vehicle 102 wheels to propel the vehicle 102 forward and/or backward. The braking subsystem can slow and/or stop vehicle 102 movement. The steering subsystem can control a yaw, e.g., turning left and right, maintaining a straight path, of the vehicle 102 as it moves.

Computers, including the herein-discussed one or more vehicle computers, which may be in the form of electronic control units (ECUs) 104, ECUs/computers in other vehicles and infrastructure 118, and central computer 120, include respective processors and memories. A computer memory can include one or more forms of computer readable media, and stores instructions executable by a processor for performing various operations, including as disclosed herein. For example, the computer can be a generic computer with a processor and memory as described above and/or an ECU, controller, or the like for a specific function or set of functions, and/or a dedicated electronic circuit including an ASIC that is manufactured for a particular operation, e.g., an ASIC for processing sensor data and/or communicating the sensor data. In another example, computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

A computer memory can be of any suitable type, e.g., EEPROM, EPROM, ROM, Flash, hard disk drives, solid state drives, servers, or any volatile or non-volatile media. The memory can store data, e.g., a memory of an ECU 104. The memory can be a separate device from the computer, and the computer can retrieve information stored in the memory, e.g., one or more ECUs 104 can obtain data to be stored via a vehicle network 112 in the vehicle 102, e.g., over an Ethernet bus, a CAN bus, a wireless network, etc. Alternatively, or additionally, the memory can be part of the computer, i.e., as a memory of the computer or firmware of a programmable chip.

The one or more ECUs 104 can be included in a vehicle 102 that may be any suitable type of ground vehicle 102, e.g., a passenger or commercial automobile such as a sedan, a coupe, a truck, a sport utility, a crossover, a van, a minivan, etc. An ECU 104 may include programming to operate one or more of vehicle 102 brakes, propulsion (e.g., control of acceleration in the vehicle 102 by controlling one or more of an internal combustion engine, electric motor, hybrid engine, etc.), steering, climate control, interior and/or exterior lights, etc., as well as to determine whether and when the computer, as opposed to a human operator, is to control such operations, such as by sending vehicle data over the vehicle network 112. Additionally, an ECU 104 or other computer may be configured to operate the vehicle 102 and/or subsystems 106 thereof, possibly with the assistance of IX Nodes 118.

An ECU 104 may include or be communicatively coupled to, e.g., via a vehicle network 112, such as a communications bus as described further below, more than one processor, e.g., included in components such as actuators 107, sensors 108, electronic controller units (ECUs) or the like included in the vehicle 102 for monitoring and/or controlling various vehicle components, e.g., a powertrain controller, a brake controller, a steering controller, etc. The ECUs 104 are generally arranged for communications on a vehicle communication network 112 that can include a bus in the vehicle 102, such as Ethernet (IEEE 802.3), a controller area network (CAN) or the like, and/or other wired and/or wireless mechanisms.

Various controllers and/or actuators 107 may receive data from one or more sensors 108 or ECUs 104 via the vehicle network 112. Vehicles 102 typically include a variety of actuators 107 and sensors 108 to detect internal states of actuated devices of the vehicle 102, for example, wheel speed, wheel orientation, and engine and transmission variables. Other actuators 107 may control the status of various components, such as ignition switch status, audio volume status, etc. Often, but not necessarily, an actuator 107 includes a digital-to-analog converter to convert a digital control signal that can be provided from a digital computer, e.g., via a network, to an analog signal that is usable by an analog control device such as a relay or solenoid, and a sensor 108 includes an analog-to-digital converter to convert an analog sensing signal to a digital signal that can be provided to a digital computer, e.g., via the network.

A vehicle network 112 is a network via which messages can be exchanged between various devices in vehicle 102. The ECUs 104 can be generally programmed to send and/or receive, via vehicle network 112, messages to and/or from other devices in vehicle 102 e.g., any or all of ECUs 104, actuators 107, sensors 108, components, communications module 110, subsystems 106 (HMI, etc.). Additionally, messages can be exchanged among various such other devices in vehicle 102 via the vehicle network 112. Further, as mentioned below, various controllers and/or actuators 107 may receive and provide data to the ECUs 104. In some implementations, vehicle network 112 can be a network in which messages are conveyed via a vehicle 102 communications bus. For example, vehicle network 112 can include an Ethernet network, a controller area network (CAN) in which messages are conveyed via a CAN bus, or a local interconnect network (LIN) in which messages are conveyed via a LIN bus. In some implementations, vehicle network 112 can include a network in which messages are conveyed using other wired communication technologies and/or wireless communication technologies e.g., Ethernet, Wi-Fi, Bluetooth, Ultra-Wide Band (UWB), etc. Additional examples of protocols that may be used for communications over vehicle network 112 in some implementations include, without limitation, Media Oriented System Transport (MOST), Time-Triggered Protocol TTP, and FlexRay. In some implementations, vehicle network 112 can represent a combination of multiple networks, possibly of different types, that support communications among devices in vehicle 102. For example, vehicle network 112 can include a CAN in which some devices in vehicle 102 communicate via a CAN bus, and a wired or wireless local area network in which some device in vehicle 102 communicate according to Ethernet or Wi-Fi communication protocols.

The ECUs 104, computers in other vehicles and IX Nodes 118, and/or central computer 120 can communicate via a wide area network 116, for example the Internet or a cellular data network. Further, various computing devices discussed herein may communicate with each other directly, e.g., via direct radio frequency communications according to protocols such as BLUETOOTH or the like. For example, a vehicle 102 can include a communication module 110 to provide communications with devices and/or networks not included as part of the vehicle 102, such as the wide area network 116 and/or other vehicles and IX Nodes 118, for example. The communication module 110 can provide various communications, e.g., vehicle to vehicle (V2V), vehicle-to-infrastructure or everything (V2X) or vehicle-to-everything including cellular communications (CV2X) wireless communications cellular, dedicated short range communications (DSRC), etc., to another vehicle 102, to an infrastructure element typically via direct radio frequency communications and/or typically via the wide area network 116, e.g., to the central computer 120. The communication module 110 could include one or more mechanisms by which a vehicle computer such as an ECU 104 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, DSRC, CV2X, and the like.

The central computer 120 may also be connected to a database 122 so that vehicle 102 may send or receive data to or from the database 122. This is sometimes referred to as a "cloud" storage.

Figure 2A:
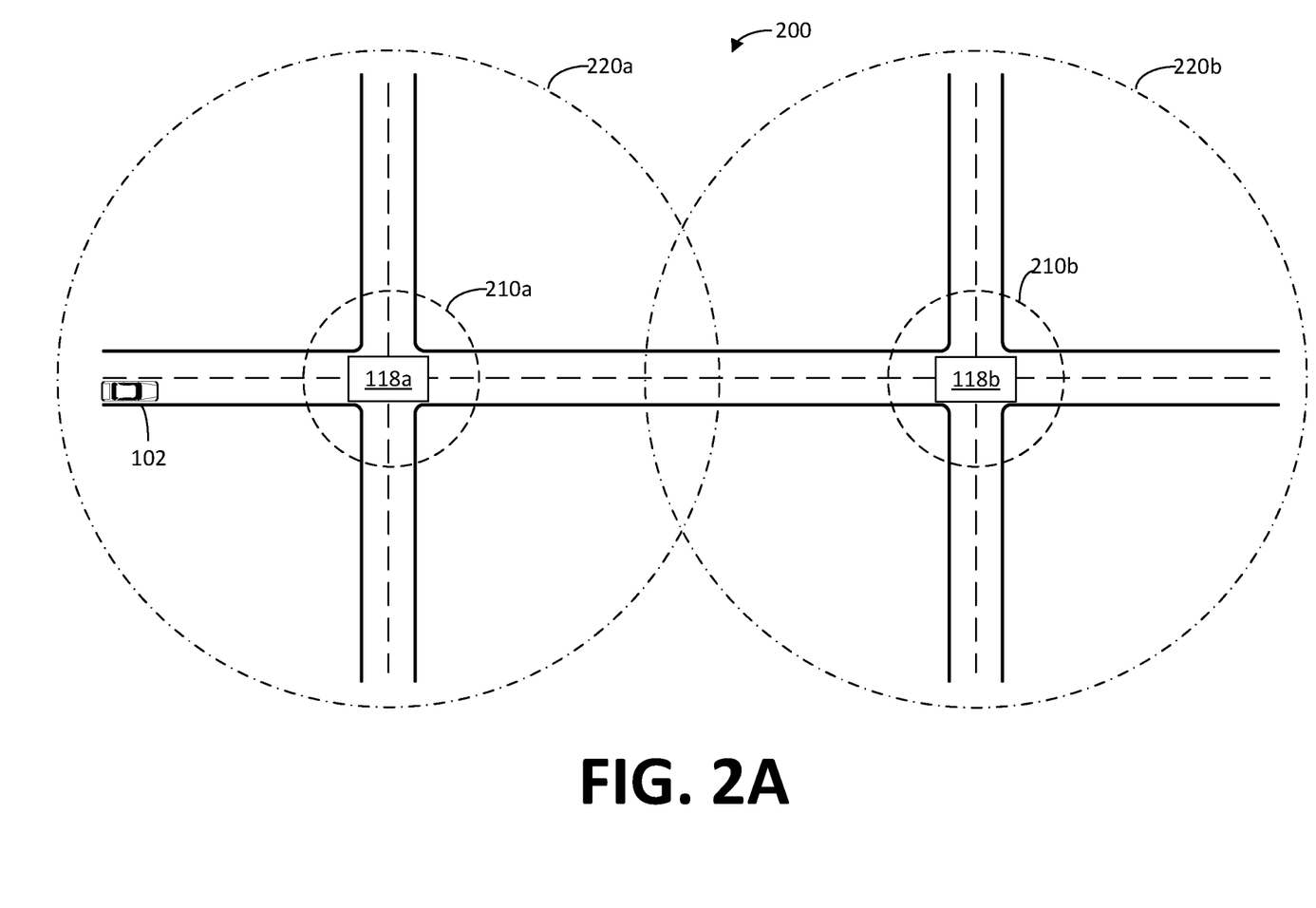
FIGS. 2A, 2B, and 2C are overhead diagrams showing field of view (FOV), broadcast range, and an IX Node assist zone of smart infrastructure nodes.

With reference to FIG. 2A, a vehicle 102 travelling on a route in scenario 200 may encounter intersections or other locations that include IX Nodes 118a and 118b. IX Node 118a may have one or more sensors with a field-of-view (FOV) 210a and an expected broadcast range 220a of ~300 m from its RSU radio. Similarly, IX Node 118b may have one or more sensors with a FOV 210b and an expected broadcast range 220b of ~300 m from its RSU radio. While each of these areas are illustrated as circles for simplicity, they may also be defined as polygons based upon the parameters of the sensors, antennas, etc. However, in real-world conditions, the expected effective range for IX Nodes 118a and 118b to reliably communicating with vehicle 102 may be affected by terrain, objects such as buildings, signage, overpasses, etc.

Figure 2B:
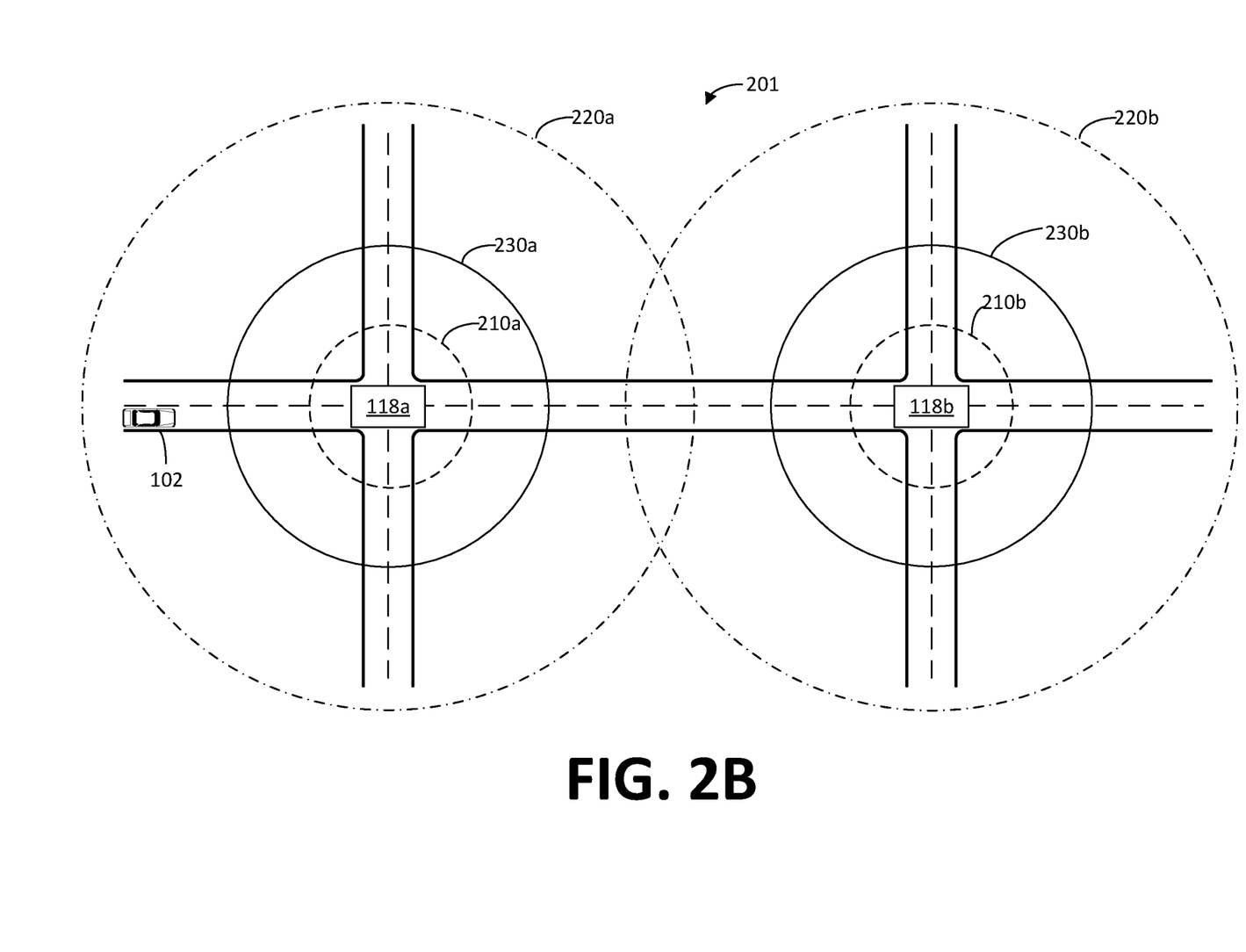

With reference to FIG. 2B, scenario 201 illustrates an IX Node assist zone 230a for IX Node 118a that is larger than FOV 210a, but smaller than expected broadcast range 220, as well as an IX Node assist zone 230b for IX Node 118b that is larger than FOV 210b, but smaller than expected broadcast range 220b. The IX Node assist zones 230a and 230b, again shown as circles for ease of illustration but definable as polygons, are based on an effective broadcast range of the RSU radios of respective IX Nodes 118a and 118b where vehicle 102 may expect to be able to reliably receive communication of data above a predetermined threshold. For example, the IX Node assist zones 230a and 230b may encompass an area having a reliability of packet delivery from respective IX Nodes 118a and 118b greater than 90%.

The areas of IX Node assist zones 230a and 230b may initially be determined based on analytical data, such as from a binary predictor classifier intersecting the route with an estimated coverage reliability zone of a broadcast area of the RSU radios of IX Nodes 118a and 118b, respectively. However, the effective broadcast zone can be analytically modeled with various levels of fidelity to define a polygon as described above. In one implementation, an analytical model with a circle of radius defined by the radio parameters (broadcast effective power) and type/protocol (CV2X, DSRC, WiFi) and RF band (5.9 GHz, etc) may be used. In an implementation at the other end of complexity/fidelity, a physics ray tracing or RF propagation/fading model can be implemented that takes into account the 3D geometry of the deployment.

Figure 2C:
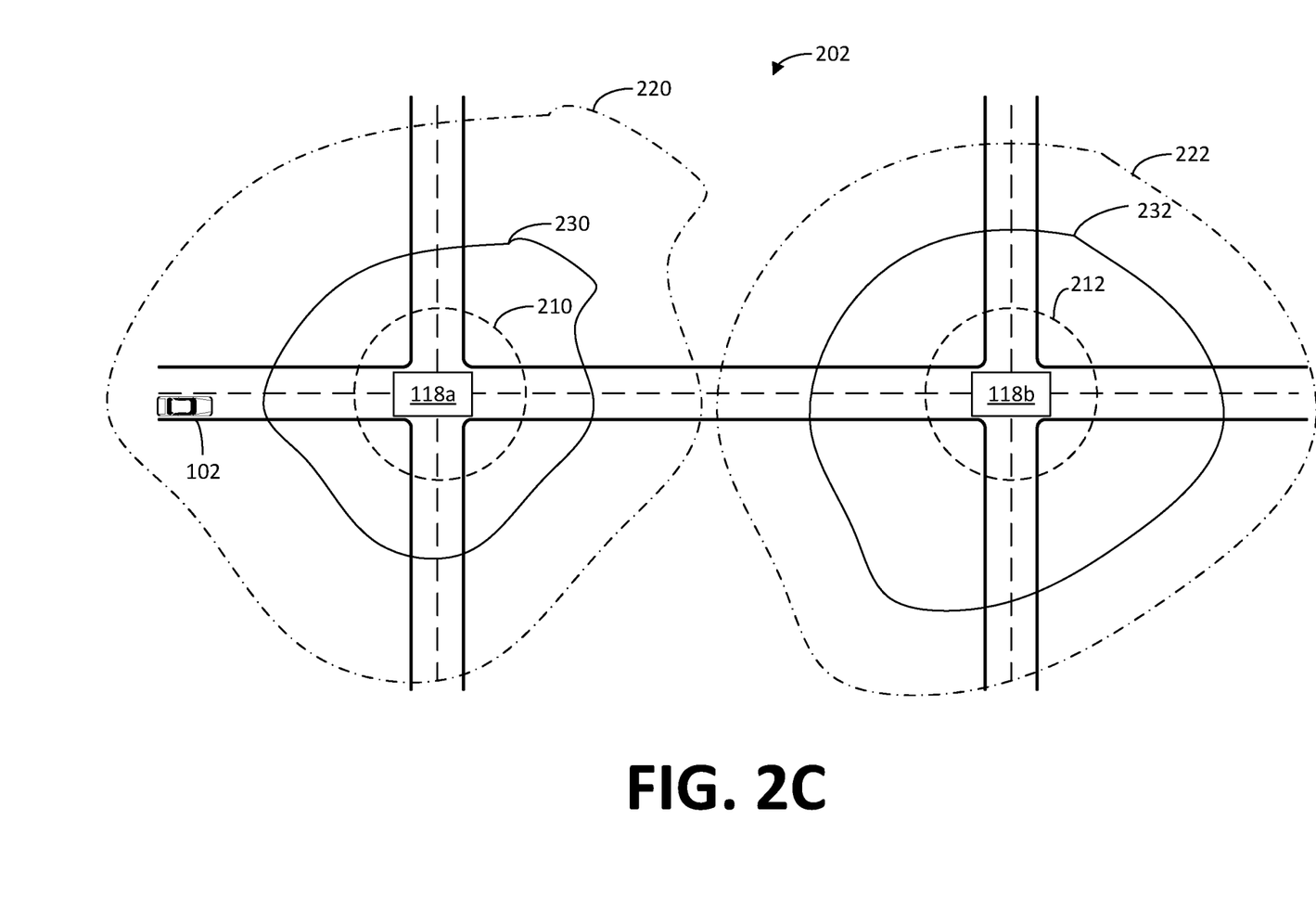

With reference to FIG. 2C, the areas of IX Node assist zones 230a and 230b may be updated/revised based upon dynamically collected data as illustrated by scenario 202. For example, due to factors such as interference from terrain, objects such as buildings, signage, overpasses, etc., the broadcast range 220a and/or 220b may be reduced or otherwise affected. Thus, it may be desirable to update the boundaries of IX Node assist zones 230a and 230b using data from vehicle 102 and/or from IX Nodes 118a and 118b.

In one implementation, the communication module 110 of vehicle 102 may establish a communication link with, i.e., determine that one or more messages are received from, the IX Node 118a and/or the IX Node 118b. Upon establishing the link, a processor such as one of the ECUs 104 of the vehicle 102 identifies a location (a "location" herein means a position on the surface of the earth specified by geo-coordinates, typically conventional geo-coordinates such as commonly used latitude and longitude coordinates) at which the link was established, and directs communication module 110 to transmit the location to a server such as central computer 120, which can then use the location data to update a boundary of the IX Node assist zone 220a and/or 220b. Data from multiple sources and interactions, e.g., multiple vehicles traveling proximate to an IX Node 118, can be collected in database 122 and used to continuously or periodically revise/update a boundary of various IX Node assist zones such as 220a and 220b. In one implementation, a packet-receive success rate can be compared against the rate of the original zone that was determined analytically. For example, the original zone may include the far right turn lane, but vehicles traveling along that road segment have a high packet drop rate along that segment due to environment (foliage, etc.) and can send feedback on the packet-receive success rate as a statistic over time and position.

Alternatively or additionally, the communication module 110 of vehicle 102 may establish a communication link with the IX Node 118a and/or the IX Node 118b and then, upon establishing the link, a processor such as one of the ECUs 104 of the vehicle 102 collects Received Signal Strength Information (RSSI) data for the link and directs communication module 110 to transmit the RSSI data to a server such as central computer 120, which can then use the RSSI data to update a boundary of the IX Node assist zone 220a and/or 220b. Data from multiple sources and interactions, e.g., multiple vehicles traveling proximate to an IX Node 118a/118b, can be collected in database 122 and used to continuously or periodically revise/update a boundary of various IX Node assist zones such as 220a and 220b.

In a further implementation, upon establishing a link with vehicle 102, IX Node 118a or 118b collects Received Signal Strength Information (RSSI) data for the link and transmits the RSSI data to a server such as central computer 120, which can then update a boundary of the IX Node assist zone 220a and/or 220b. Data from multiple sources and interactions can be collected in database 122 and used to continuously or periodically revise/update a boundary of various IX Node assist zones such as 220a and 220b.

While FIG. 2C illustrates fields of view 210a/210b, broadcast range is 220a/220b, and IX Node assist zones 230a/230b in all directions, i.e., as complete or closed shapes, a vast majority, if not all, of location and/or RSSI data will be from the locations at which vehicles are moving on roadways. Accordingly, data may be incomplete in some directions and will need to be interpolated or continue reliance on the initial analytical data.

Figure 3:
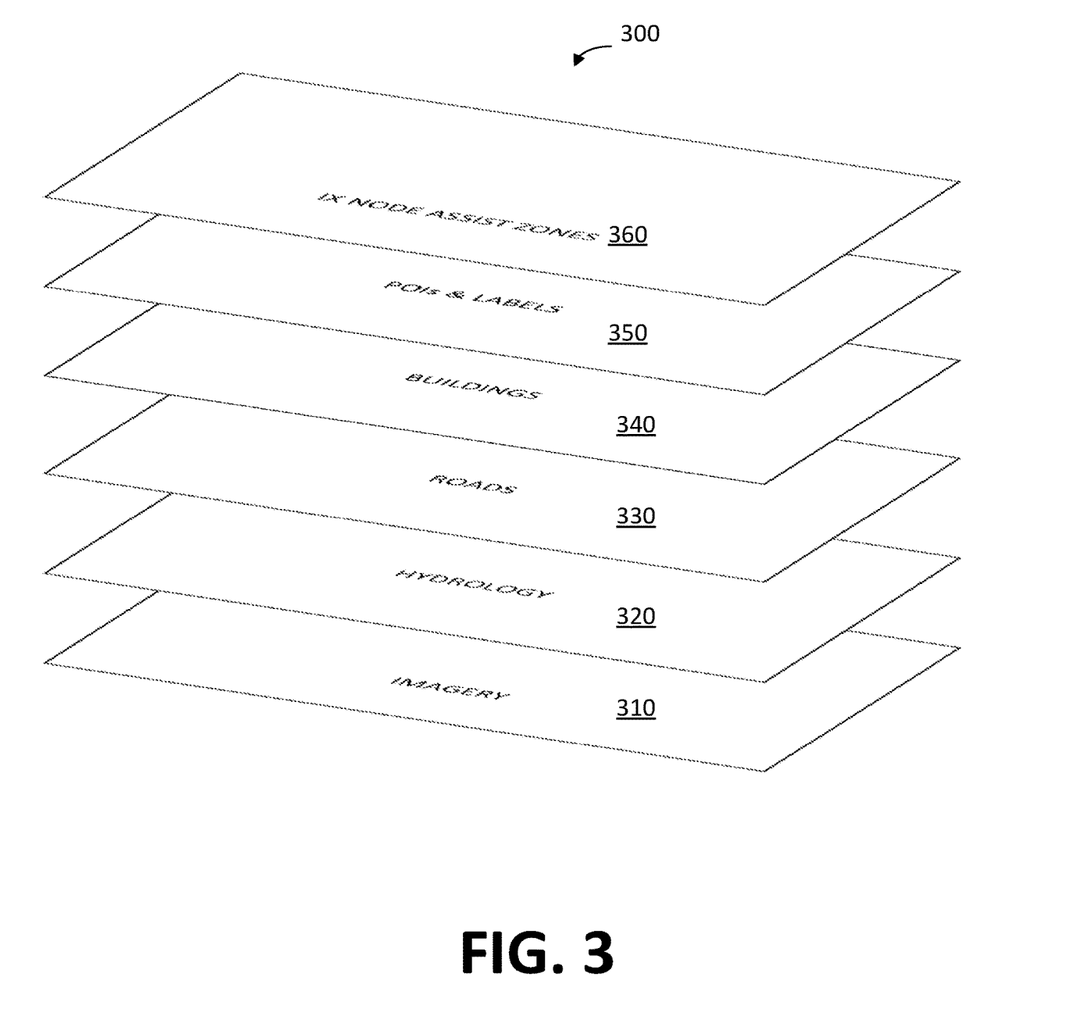
FIG. 3 illustrates an example of map layer usage.

With reference to FIG. 3, an implementation is illustrated wherein data about one or more IX Nodes 118 is provided for storage in a vehicle computer such as an ECU 104 in the form of a map 300 having multiple layers 310-360. In the present context, a map layer means a set of data describing a species or type of attribute of locations in a map area, i.e., a set of data including locations paired with descriptions of features at the respective locations. For example, map 300 may include an image layer 310 that includes images from satellites or aircraft, a hydrology layer 320 that includes water features such as oceans, seas, lakes, rivers, creeks, canals, ponds, etc., a roads layer 330 that includes highways, primary roads, secondary roads, residential streets, parking lots, etc., and may be combined as a transportation layer that further includes train tracks, subway lines, trolly lines, ferry lines, etc., a buildings layer 340 that includes buildings, parking structures, stadiums, houses, etc., and a Points of Interest (POI) & labels layer 350 that labels elements of other layers and may be combined with a boundary layer showing boundaries, demographics, zoning.

Advantageously, the present disclosure provides that a map 300 with an IX Node assist zones layer 360. The map 300 can be implemented using any suitable format, but is typically implemented as a vector map. While both raster maps and vector maps may use layers, vector maps have advantages of being resolution independent and using less bandwidth.

In an implementation, the IX Node assist zone map layer 360 may include data provided by a computer 120 to vehicles 102 from a database 122 that stores map data for areas around one or more IX Nodes 118. The IX Node assist zone map layer 360 data may include: first data providing a point defining a position of an IX Node 118 having a sensor; second data providing a first polygon defining a FOV 210 zone of the sensor; third data providing a second polygon defining a broadcast range 220 zone of the IX Node 118 based on seeded analytical data; fourth data providing a third polygon defining an IX Node assist zone 230 within the broadcast range 220 zone but extending beyond the FOV 210 zone where a vehicle 102 expects messages from the IX Node 118; and fifth data providing metadata of the IX Node including a type and accuracy of the sensor.

The metadata of the fifth data may also include an identifier and/or description of a service advertisement for one or more infrastructure assist applications provided by the smart infrastructure node. For example, the infrastructure assist application may include, but is not limited to, a left turn assist application, a maneuver assist application, a pedestrian detection application, an emergency vehicle detection and response application, an intersection violation detection application, a construction zone (dynamic updates) application, a signal preemption application (for transit/emergency/priority road users), or an intersection movement assistance application.

The IX Node assist zone layer 316 may be provided in any suitable format; in one implementation, the first to fifth data may be stored as vector objects so as to provide the IX Node assist zone layer 360 as a vector layer of a vector map application. Map applications using the IX Node assist zone layer 360 may be implemented as a web application in the vehicle with an application programming interface (API) to the database 122 to obtain the data for various mapping applications, including vehicle map applications, Advanced Driver Assistance System (ADAS) map applications, and general map applications (Google maps, Waze, etc.).

Figure 4:
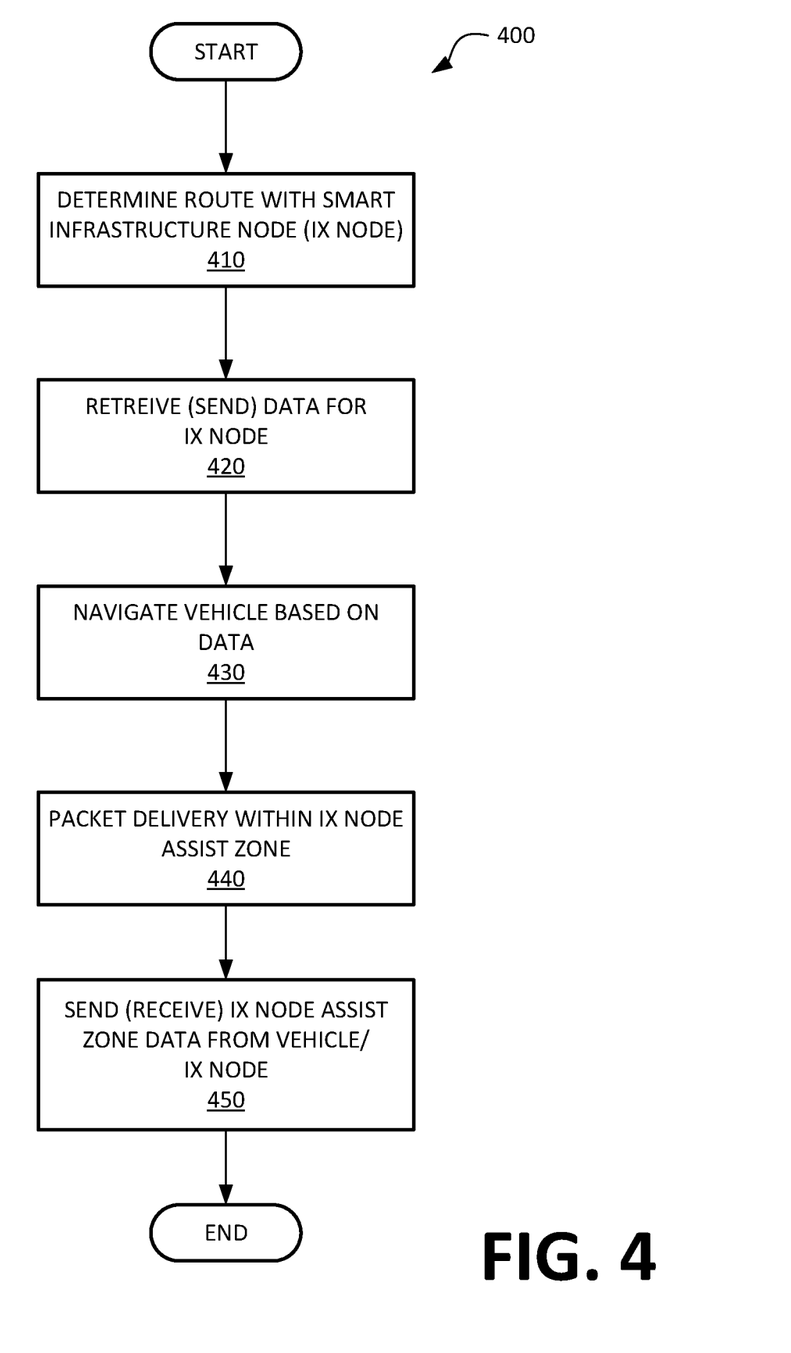
FIG. 4 is a flow diagram of providing map data with IX Node assist zones.

With reference to FIG. 4, an implementation of a method 400 of the present disclosure is illustrated. Blocks of the method 400 may be carried out in a vehicle computer 104, unless explicitly noted otherwise. While not a prerequisite in all implementations of the present disclosure, a first step in many cases is a determination by the vehicle 102 of a route that passes within a predetermined distance of an IX Node at block 410.

Next, at a block 420, the vehicle 102 then retrieves, from the central computer 120, data for the IX Node 118 to obtain pre-stored data about the IX Node 118, i.e., data that can be retrieved from a memory of a computer in the vehicle 102 prior to any communication with the IX Node 118. The pre-stored data for each IX Node 118 typically includes the area of its IX Node assist zone 230, which permits the vehicle 102 to determine locations at which to expect to reliably receive messages from the IX Node 118. The data also includes sensor data and assistive application data which permits the vehicle 102 to select assistive applications it may use when operating inside the IX Node assist zone and navigate based on data at block 430.

At block 440, the vehicle 102 enters the IX Node assist zone and reliably receives messages from the IX Node 118. These messages are typically via data packet delivery with reliability above a predetermined threshold selected based on empirical testing and/or simulation of a reliability level to support vehicle 102 operations, such as 90%.

In a block 450, the vehicle 102 and/or the IX Node, after establishing communication, can send data to the central computer 120, which can use the data to dynamically update the area of the IX Node assist zone at block 450. This data can be location or RSSI data from the vehicle 102 or RSSI data from the IX Node.

The process 400 ends following the block 450.

Figure 5:
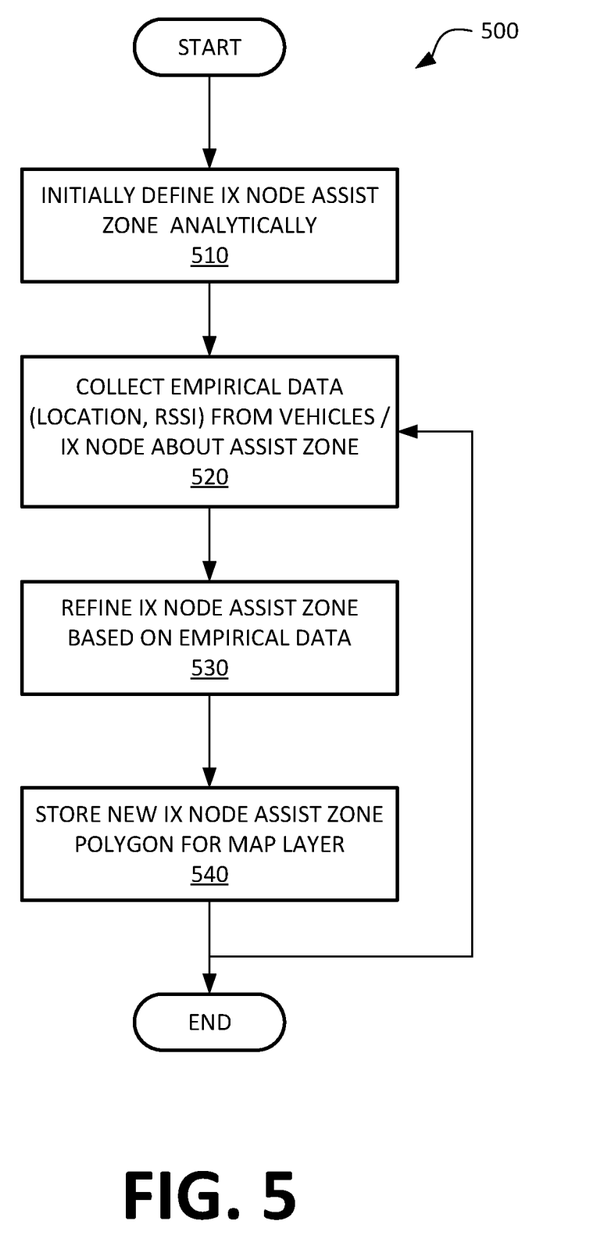
FIG. 5 is a flow diagram of refining map data of an IX Node assist zone using empirical data.

Referring to FIG. 5, an example of an implementation of server-side processing, e.g., in a central computer 120, of a method 500 for defining an IX Node assist zone is illustrated. At block 510, the server initially defines an IX Node assist zone polygon using analytical data. For example, analytical data from a binary predictor classifier intersecting the route with an estimated coverage reliability zone of a broadcast area of the RSU radio of the IX Node may be used to define the polygon. At block 520, the server collects or otherwise receives data from vehicles or the IX Node about the IX Node assist zone. For example, a vehicle may send its location and/or RSSI data upon establishing reliable communication with the IX Node, and an IX Node may send RSSI data upon establishing reliable communication with the vehicle.

The collected empirical data may then be used by the server to update the area/boundary of the IX Node assist zone based upon the collected empirical data at block 530. A new polygon defining the IX Node assist zone for the map layer is then stored in the database at block 540 for use by the map application. Method 500 then returns to block 520 to collect more empirical data, which can be done continuously for each vehicle or periodically over time. When additional data does not result in a new polygon, the process 500 may end.

While disclosed above with respect to certain implementations, various other implementations are possible without departing from the current disclosure.

Use of in response to, based on, and upon determining herein indicates a causal relationship, not merely a temporal relationship. Further, all terms used in the claims are intended to be given their plain and ordinary meanings as understood by those skilled in the art unless an explicit indication to the contrary is made herein. Use of the singular articles "a," "the," etc. should be read to recite one or more of the indicated elements unless a claim recites an explicit limitation to the contrary.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain implementations and should in no way be construed so as to limit the present disclosure.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computing device for a vehicle comprising a processor and a memory, the memory storing instructions executable by the processor, the instructions comprising instructions to:

retrieve, prior to receiving messages from a smart infrastructure node (IX Node), data about the IX Node including (a) an IX Node assist zone defined based on an effective broadcast range of a radio of the IX Node, (b) an IX Node field of view area that is within the IX Node assist zone and that is defined by a field of view of one or more IX Node sensors, and (c) available services from the IX Node;

select a vehicle application for operation on a route while in the IX Node assist zone based on the IX Node field of view area, and the available services from the IX Node, and/or a type and accuracy of one or more IX Node sensors; and operating the vehicle using the selected vehicle application.

2. The computing device of claim 1, wherein the application is a left turn assist application, a maneuver assist application, a pedestrian detection application, an emergency vehicle detection and response application, an intersection violation detection application, a construction zone application, a signal preemption application, or an intersection movement assistance application.

3. The computing device of claim 1, wherein the IX Node assist zone is an area having a reliability of communication from the IX Node above a predetermined threshold.

4. The computing device of claim 1, wherein the IX Node assist zone and the IX Node field of view area are defined as respective polygons.

5. The computing device of claim 4, wherein the polygons are objects included in map data stored in the vehicle.

6. The computing device of claim 1, wherein the instructions to retrieve data about the IX Node are initiated based on instructions that:

determine that the route on which the vehicle is operating will pass within a predetermined distance of the IX Node.

7. The computing device of claim 1, further comprising instructions to:

establish a communication link with the IX Node;

collect location data upon establishing the communication link with the IX Node; and transmit the location data to a server to update a boundary of the IX Node assist zone.

8. The computing device of claim 1, further comprising instructions to:

establish a communication link with the IX Node; and transmit a Received Signal Strength Information (RSSI) of the communication link to a server to update a boundary of the IX Node assist zone.

\* \* \* \* \*